United States Patent Office 3,382,846
Patented May 14, 1968

3,382,846
METHOD OF PRODUCING A SPECIFIC GENETIC EFFECT RESULTING IN A LARGER AND EARLIER MATURING DOMESTIC FOWL
Alexander J. J. Roncari, David Whiteford, and Richard H. Tomlinson, all % McMaster University, Hamilton, Ontario, Canada
No Drawing. Filed Mar. 28, 1966, Ser. No. 537,658
Claims priority, application Great Britain, Mar. 29, 1965, 13,255/65
4 Claims. (Cl. 119—1)

ABSTRACT OF THE DISCLOSURE

The invention relates to a method of producing a genetic effect in a living organism, and more particularly to a method of obtaining certain useful genetic effects by the treatment of egg-laying animal organisms with ultrasonic waves.

---

The production of mutants in living organisms is of course a well known phenomenon. Mutations may be produced in various ways, for instance by treatment with various chemicals such as the nitrogen mustards, by treatment with X-rays or ultra violet radiation, or naturally. The most frequently produced effect of mutation is probably the lethal effect; that is, mutant genes are usually so deleterious in their effect that they tend to kill the organism or at least interfere with its ability to survive in its usual habitat. When not positively lethal, a mutation will usually hinder rather than help the organism to fulfill the function of its existence, for mutations are, after all, accidental in nature. It is evident therefore that treatments of an organism with mutagens cannot be employed to produce a specific genetic effect; rather such a treatment would give a great variety of effects mostly of an unwanted character, with the chance of obtaining any useful mutation being perhaps one in every thousand mutations produced.

It is, accordingly, an object of the present invention to devise a treatment of living organisms that produces a high incidence of useful genetic effects. It is a further object of the invention to produce larger and earlier maturing domestic fowl such as chickens, turkeys and ducks. It is yet another object of the invention to produce larger or earlier maturing plants, especially those yielding edible products.

The present invention is based on the discovery that ultrasonic waves of certain frequencies are capable of producing useful genetic effects in living organisms. Such a treatment is quite distinct from the use of agents such as X-rays to produce mutations in that all, or at least a considerable majority, of the organisms treated by ultrasonic waves under a given set of conditions will show the same genetic effect. More particularly, proper choice of the frequency of the ultrasonic waves and the manner and length of time of the treatment results in the treated organism growing to a greater size with a tendency to earlier maturing. In organisms characterized by biparental origin, at any rate in the animal kingdom, another effect is apparent, namely the $F_1$ generation from such treated individuals shows a third form intermediate between the two forms normally called male or female.

A possible explanation of the results obtained by the ultrasonic treatment in accordance with the invention is the production of polyploidy, more specifically of tetraploidy in the treated individuals and their off-spring. This theory seems to be supported by the larger size to which treated organisms and their offsrping grow, and explains the sexual phenomenon just referred to. In birds, for instance, females possess the XY chromosomes and males the XX chromosomes. Treatment of eggs of domestic fowls in accordance with the invention results in birds which are larger and quicker maturing than normal, and offspring of matings from such birds (the $F_1$ generation) show similar characteristics and apparently are obtained in a ratio of about 3 males for each female, Upon closer inspection, however, a large proportion of these "male" birds are seen to differ from the remaining males, having a higher pitched voice and slightly smaller size. A tetraploidy theory suggests that treated individuals, namely XXYY females and XXXX males, would produce as an $F_1$ generation the following sexual forms: XXYY (females); XXXY ("female males"); and XXXX (males or "male males"). Moreover, such forms would be expected to be produced in the ratio of 1:2:1 which is in accord with our observations. The $F_2$ and succeeding generations produced by mating "male males" with females would be expected to be similar to the $F_1$ generation, and such has in fact been observed at least as far as the $F_3$ or $F_4$ generation. However, tetraploidy has not been confirmed by observation of the chromosomes although a partial tetraploidy involving certain chromosomes only has not been ruled out.

The ultrasonic frequencies found effective in producing the specific genetic effects in accordance with the invention are particularly those of about 0.5 mc./s. (one half megacycle per second) and somewhat above with some variation from one organism to another. With hen's eggs, for instance, 2.25 mc./s. is an effective frequency for producing a desirable genetic effect, namely a larger race of bird which is earlier maturing than normal birds of the same (untreated) breed. Treatment of lemon and grapefruit seeds, on the other hand, has been accomplished successfully at 0.5 mc./s. to give quicker growing seedlings. Similarly, the necessary length and intensity of the ultrasonic treatment varies somewhat from one organism to another, and possibly also depending on the exact stage at which the organism is treated. As might be expected, particularly on the basis of the possible theory postulated above, the most satisfactory stage at which to treat an organism, in accordance with the invention, is at as early a stage as possible, it also being necessary or at least highly desirable that the organism is not dormant. Thus, a hen's egg should be at incubation temperature or should have been at such temperature, preferably for about 24 hours, even if it has cooled a certain amount at the actual time of treatment, an incubation should thereafter be continued until hatching takes place. The chicks can thereafter be reared in accordance with normal practice. In the case of seeds, these should have been subjected to germination conditions, preferably for about 24 hours, prior to treatment and thereafter germination allowed to continue under normal conditions.

A satisfactory manner of conducting the treatment is to contact the organism directly with the transducer of an ultrasonic generator. To concentrate the vibrations, an egg or seed may be immersed in water in a small vessel while being contacted with the transduced. Under these conditions, an effective treatment may take from a few seconds to some minutes. Satisfactory results with hen's eggs immersed in water were obtained by treating for three minutes, while with lemon and grapefruit seeds on the surface of an agar jelly 30 and 40 minutes produced good results with apparently no adverse effects.

The following examples further illustrate the invention.

Example 1

Fertile white Leghorn eggs, stored since laying for about one to two weeks at 13° C. and 88%-RH (relative humidity) were incubated at 39.5° C. for 24 hours. The eggs were then taken out of the incubator, treated with ultrasonic vibrations and replaced in the incubator where they remained until hatching took place.

The ultrasonic treatment was carried out with a Sperry Reflectoscope UR 600 ultrasonic generator with a 2.25 mc./s. transducer attached. The egg to be treated was placed on a support made of glass tubing 3 cm. in diameter, and the egg arranged thereon horizontally, i.e., with its axis of symmetry horizontal, the lower end of the glass tubing being fused into the bottom of a 450 cc. beaker which was about three quarters filled with water. The egg on its support lay immersed at a level of about half that of the water surface. The transducer of the ultrasonic generator was then applied manually to the upper surface of the egg which was rotated about different axes during the treatment so that the application was approximately uniform over the egg's surface. The generator was set at maximum amplitude, while the time of treatment was varied from 15 seconds to 165 seconds.

After hatching, the chicks were reared in the normal manner on a diet containing 18% crude protein, 3% fat and 6% fibre until 5 weeks old, and thereafter fed a diet containing about 16% crude protein, 3% fat and 4.5% fibre.

The results obtained by treating 12 eggs are shown in the following table:

TABLE I

| Egg No. | Time of treatment (seconds) | Hatching | Sex | Survived Until |
|---|---|---|---|---|
| 1 | 15 | + | m | 84 hours. |
| 2 | 65 | + | m | 72 hours. |
| 3 | 100 | + | m | 70 hours. |
| 4 | 110 | + | m | Adulthood. |
| 5 | 120 | + | m | Do. |
| 6 | 130 | + | m | Do. |
| 7 | 155 | − | | |
| 8 | 160 | + | f | Do. |
| 9 | 165 | + | f | Do. |
| 10 | 165 | + | f | Do. |
| 11 | 165 | + | m | Do. |
| 12 | 165 | + | m | Do. |

The survivors grew rapidly, feathering earlier than controls and at all stages being noticeably larger.

The failure of egg No. 7 to hatch was considered to be owing to infertility and was probably not connected with the ultrasonic treatment. The high ratio of males to females was considered to be a chance variation. In a control group of 12 incubated and reared under identical condition except for the ultrasonic treatment, the proportion was 5 males to 7 females, and the proportion for the two groups together was 13 males to 10 females. These results suggest that insufficient ultrasonic energy absorbed by the egg results in deleterious effects which are not in evidence as soon as the treatment time rises above about 100 to 110 seconds.

Example 2

The procedure of Example 1 was repeated but with slightly different treatment times, varying from a minimum of 110 seconds by increments of 5 seconds to a maximum of 165 seconds. Eleven eggs hatched yielding 8 males and 3 females. All these birds survived into adulthood. The average weights of these birds and of a control group, at different ages, are shown in the following table:

TABLE II

| Age | Average Weights (grams) | |
|---|---|---|
| | "Treated" birds | Controls |
| 6 Weeks: | | |
| Females | 515 | 410 |
| Males | 680 | 450 |
| 6 Months: | | |
| Females | 2,400 | 1,800 |
| Males | 3,200 | 2,100 |

The largest of the males was then bred at 6 months of age with the females and 12 eggs selected for incubation in accordance with standard selection techniques. These eggs were hatched in an incubator under standard conditions (39.5° C.) yielding 4 females and (apparently) 8 males. A second generation of birds was also bred from the first generation controls, eggs for incubation being selected in the same manner. Results for this $F_1$ generation are set out in the following table:

TABLE III

| Age | Average Weights (grams) | |
|---|---|---|
| | Progeny of "Treated" birds | Controls |
| 6 Weeks: | | |
| Females | 525 | 415 |
| "Males" | 670 | 465 |
| 6 Months: | | |
| Females | 2,500 | 1,850 |
| "Males" | 3,100 | 2,200 |

In the same manner and $F_2$ and an $F_3$ generation were produced, there being 3 females to 9 "males" and 4 females to 8 "males" respectively. No deterioration in the new strain was observed and the superiority in weight and early maturing over the controls was evident throughout.

In connection with each of the $F_1$, and $F_2$ and $F_3$ generations of the new strain, the designation "males" hereinabove refers to those birds that showed substantially male characteristics. Close observation, however, revealed that about two thirds of these "males" were less male than the remaining third, being not quite so large, having a higher pitched voice, having smaller comb and wattles, and showing less readiness to mate with the females. The breeding of the $F_2$ and $F_3$ generations was therefore carried out by selecting the bird with the most pronounced male characteristics to mate with the hens.

Example 3

A number of grapefruit and lemon seeds were maintained under germination conditions for 36 hours by which time they had sprouted, and were then contacted with an 0.5 mc./s. transducer attached to a Sperry Reflectoscope UR 600 ultrasonic generator operated at maximum amplitude. The seeds were placed on the surface of an agar jelly and covered with water while being subjected to the ultrasonic wave treatment, the duration of this being 30 minutes. The seeds were then planted in flats and seedlings grown. A control group were grown under similar conditions except for the ultarsonic treatment. By 12 weeks old, the size difference between the seedlings from the treated seeds and those from the control seeds was considered to be significant, the former being quite obviously larger.

What we claim as our invention is:

1. A method of producing a larger and earlier maturing egg-laying animal which comprises subjecting a fertile egg of said animal at an early stage in its life cycle when cell division is being initiated to ultrasonic vibration having a frequency in the megacycle range.

2. A method as claimed in claim 1 wherein the animal is a domestic fowl, the frequency of the vibration is about 2.25 megacycles per second, and the time of treatment is at least about two minutes.

3. A method of producing a larger and earlier maturing domestic chicken which comprises subjecting a fertile hen's egg to incubation for about 24 hours, subjecting the thus obtained partially incubated egg to ultarsonic vibration at a frequency of about 2.25 megacycles per second until the initially obtained lethal effects are no longer obtained, and continuing the incubation of the thus treated egg until hatching takes place.

4. A method as claimed in claim 3 wherein the ultrasonic vibration treatment is carried out by immersing the partially incubated egg in a non-toxic liquid, and contacting the surface of the immersed egg with the transducer of an ultrasonic generator while rotating the egg about different axes to obtain substantially uniform treatment over the egg's surface.

References Cited

UNITED STATES PATENTS

| | | | |
|---|---|---|---|
| 2,448,372 | 8/1948 | Horsley | 128—24.05 X |
| 2,745,789 | 5/1956 | Specht | 195—71 |
| 2,824,546 | 2/1958 | Klette | 119—1 |
| 2,851,006 | 9/1958 | Taylor | 119—1 |
| 2,922,999 | 1/1960 | Carlin | 43—131 X |
| 3,148,649 | 9/1964 | Moore et al. | 119—1 |
| 3,156,212 | 11/1964 | Buell | 116—137 |
| 3,328,908 | 7/1967 | Moe | 43—124 X |

FOREIGN PATENTS

| | | |
|---|---|---|
| 868,795 | 2/1953 | Germany. |
| 312,691 | 4/1956 | Switzerland. |

ALDRICH F. MEDBERY, *Primary Examiner.*